(12) United States Patent
Yasuda et al.

(10) Patent No.: US 6,784,280 B1
(45) Date of Patent: Aug. 31, 2004

(54) POLYSUCCINIMIDE(CO) POLYMER DERIVATE AND PROCESS FOR PRODUCTION THEREOF

(75) Inventors: Shinzo Yasuda, Ushiku (JP); Masaharu Mukouyama, Ibaraki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/762,536

(22) PCT Filed: Jun. 6, 2000

(86) PCT No.: PCT/JP00/03664

§ 371 (c)(1),
(2), (4) Date: Feb. 8, 2001

(87) PCT Pub. No.: WO00/75217

PCT Pub. Date: Dec. 14, 2000

(30) Foreign Application Priority Data

Jun. 9, 1999 (JP) .......................................... 11-162397

(51) Int. Cl.[7] .................... C08G 73/00; C08G 66/08; C09G 63/02
(52) U.S. Cl. ................... 528/328; 528/360; 528/363; 528/367; 528/373; 528/374; 525/419; 525/420
(58) Field of Search ................. 528/328, 363, 528/170, 322, 360, 367, 373, 374, 392; 525/419, 420, 418

(56) References Cited

U.S. PATENT DOCUMENTS

| | | | |
|---|---|---|---|
| 3,927,204 A | 12/1975 | Neri et al. | 424/101 |
| 5,112,507 A * | 5/1992 | Harrison | 252/51.5 |
| 5,219,952 A | 6/1993 | Koskan et al. | 525/419 |
| 5,466,779 A | 11/1995 | Ross | 528/363 |
| 5,506,335 A | 4/1996 | Uhr et al. | 528/322 |
| 5,541,090 A * | 7/1996 | Sakano et al. | 435/109 |
| 5,565,528 A * | 10/1996 | Harrison et al. | 525/327.6 |
| 5,639,832 A | 6/1997 | Kroner et al. | 525/419 |
| 5,726,280 A | 3/1998 | Uhr et al. | 528/328 |
| 5,910,564 A | 6/1999 | Gruning et al. | 528/310 |
| 5,939,296 A * | 8/1999 | Sakano et al. | 435/145 |
| 5,939,517 A * | 8/1999 | Mazo et al. | 528/313 |
| 6,150,142 A * | 11/2000 | Mukouyama et al. | 435/109 |
| 6,197,897 B1 * | 3/2001 | Mazo et al. | 525/420 |
| 6,214,589 B1 * | 4/2001 | Mukouyama et al. | 435/109 |
| 6,300,105 B1 * | 10/2001 | Mukouyama et al. | 435/109 |
| 6,380,350 B1 * | 4/2002 | Mukouyama et al. | 528/328 |

FOREIGN PATENT DOCUMENTS

| | | | |
|---|---|---|---|
| EP | 0658586 A1 * | 6/1995 | |
| EP | 0 783 013 A1 | 7/1997 | ........... C08G/69/10 |
| EP | 0 791 616 A1 | 8/1997 | |
| EP | 0 826 716 A2 | 3/1998 | ........... C08G/73/06 |
| EP | 0 866 084 A2 | 9/1998 | |
| EP | 1120433 A1 * | 8/2001 | |
| JP | A 8-507558 | 8/1996 | |
| JP | A 8-239468 | 9/1996 | |
| JP | A 9-59375 | 3/1997 | |
| JP | A 9-235372 | 9/1997 | |
| JP | A 9-302088 | 11/1997 | |
| JP | A 10-139880 | 5/1998 | |
| JP | A 10-147644 | 6/1998 | |
| JP | A 10-292044 | 11/1998 | |
| WO | WO 96/10025 | 4/1996 | |
| WO | WO 96/20237 | 7/1996 | |
| WO | WO 99/05346 | 2/1999 | ............. D01F/6/80 |
| WO | WO 99/37624 | 7/1999 | ......... C07D/243/00 |

OTHER PUBLICATIONS

Neri, Paolo et al., "Synthesis of α,β-Poly[(2-hydroxyethyl)-DL-aspartamide], a New Plasma Expander", Journal of Medicinal Chemistry, vol. 16, No. 8, pp. 893–897 (1973).

* cited by examiner

Primary Examiner—P. Hampton Hightower
(74) Attorney, Agent, or Firm—Fish & Richardson P.C.

(57) ABSTRACT

A process for producing a polysuccinimide (co)polymer derivative which permits the reaction of a polysuccinimide (co)polymer with a Lewis base in a wide temperature range (90° to 300° C.) without using a pH-adjusting agent is provided. The process for producing a polysuccinimide (co)polymer derivative of this invention comprises reacting a polysuccinimide (co)polymer with a Lewis base by heating in the presence of a solvent having a low boiling point and high relative permittivity.

17 Claims, No Drawings

POLYSUCCINIMIDE(CO) POLYMER DERIVATE AND PROCESS FOR PRODUCTION THEREOF

TECHNICAL FIELD

The present invention relates to a novel process for the production of a polysuccinimide (co)polymer derivative and a polysuccinimide (co)polymer derivative obtained thereby.

BACKGROUND ART

A polysuccinimide (co)polymer, which has high mechanical strength because of the structure of its main chain, has been expected to be used in the applications where such characteristics are required. In addition, it also has been expected to be served as a precursor for a biodegradable material, because the aspartic main chain resulted from the ring-opening of its imide rings is biodegradable. As typical applications of the polymer, polyaspertic acid to be obtained by the hydrolysis of polysuccinimide may be used in various applications such as a chelating agent, an antiscaling agent, a builder for a cleaning agent, a humectant and an additive for a fertilizer.

The polysuccinimide (co)polymer which has been commonly available at present, however, has a low molecular weight and hence is limited in the scope of applications. There also gives a problem that it may not produce significantly high performance, even though it can be used.

Various processes, therefore, have been attempted in order to obtain a polysuccinimide (co)polymer having a higher molecular weight. For example, the following processes have been heretofore known: a process which comprises subjecting aspartic acid to the polycondensation in the presence of a polymerization catalyst such as phosphoric acid, and sulfuric acid (JP-A-8-239,468), a process which comprises grafting an amino acid onto a polysuccinimide (co)polymer to obtain a polysuccinimide (co)polymer having a high molecular weight (JP-A-9-235,372), a process which comprises using a phosphorous compound in the polycondensation system of a reactant of aspartic acid, maleamic acid, maleic acid and ammonia to obtain a polysuccinimide (co)polymer having a high molecular weight (EP-A-791616), a process which comprises adding a specific amounts of a catalyst and a polymerization promoter to the polymerization system and polymerizing the mixture in a substantially solid state to obtain a polysuccinimide (co)polymer having a high molecular weight (JP-A-9-302,088), and a process which comprises adding a compound having two or more oxazoline structures in its molecule as a chain extender to the polycondensation system of a reactant of aspartic acid, maleamic acid, maleic acid and ammonia to obtain a polysuccinimide (co)polymer having a high molecular weight and polymerizing the mixture to obtain a polysuccinimide (co)polymer having a high molecular weight (JP-A-10-147,644).

All the polymerization (polycondensation) reaction disclosed in the above publications, however, have had either complicated processes or employed expensive catalysts and thus have not been always regarded to be satisfactory as an industrial process.

As mentioned above, a simple process capable of producing a polysuccinimide (co)polymer with a high molecular weight at a low cost has long been earnestly desired but not found to the moment.

A polysuccinimide (co)polymer derivative to be produced by reacting the polysuccinimide (co)polymer obtained as described above with an amino compound has been well-known to be useful as an antiscaling agent, a chelating agent, and a builder for a detergent. One of the characteristics thereof is that it can also been converted into a biodegradable polyaspartic acid derivative as is discussed on the polysuccinimide (co)polymer derivative.

As the typical process for producing such a polysuccinimide (co)polymer derivative, a process which comprises reacting a polysuccinimide (co)polymer in a solid state or a polysuccinimide (co)polymer which has been dissolved in an organic solvent such as dimethylformamide (DMF) and N-methylpyrrolidone with an amino compound (for example, U.S. Pat. No. 5,726,280 and U.S. Pat. No. 5,726,280), and a process which comprises reacting polysuccinimide with an amino acid at a specific pH in an aqueous medium to produce a polysuccinimide (co)polymer derivative (U.S. Pat. No. 5,639,832) have been heretofore reported. According to the former process, however, there have been such a problem as that the reaction of a polysuccinimide (co)polymer in the solid phase brings about a heterogeneous reaction and can not produce a derivative having uniform properties, and that the reaction is heavily exothermic and causes safety problem to the operation. In addition to these problems, as the organic solvent used in the reaction such as dimethylformamide and N-methylpyrrolidone has similar polarity to that of the produced polysuccinimide (co)polymer derivative and has a high boiling point, the isolation and purification after the reaction are extremely difficult, which limits the scope of applications of the product.

In the latter process, a step is indispensable in which a pH value is adjusted so that at least 5% of the non-protonated amino groups of the amino acid is present in the amount equal to those protonated. In this process, an alkali such as sodium hydroxide or ammonia is used as a pH-adjusting agent. The ring-opening modification of an imide ring with the amino group competes with the base of the above-mentioned pH-adjusting agent. In general, since the basicity of an amino acid is lower, such a problem has been generated as that the reaction efficiency of the of polysuccinimide with the amino acid is low, i.e., the yield of the polysuccinimide (co)polymer derivative aimed at is not satisfactory. In addition to these problems, according to the process disclosed in JP-A-8-507,558, there has been also such a drawback as that that the reaction has to be carried out at a temperature within a relatively narrow range as of from 0° to 100° C., because the glass transition point (Tg) of the polysuccinimide (co)polymer is higher than its decomposition point and thus the polysuccinimide (co)polymer is decomposed prior to being molted when heated in order to melt the polysuccinimide (co)polymer.

As described above, there has been no processes that can conveniently and easily produce a polysuccinimide (co)polymer derivative with a high reaction efficiency, allows simple isolation and purification operations, without using an organic solvent having similar polarity and a high boiling point such as dimethylformamide and N-methylpyrrolidone and requiring any pH-adjusting step.

An object of the present invention, therefore, is to solve the above-mentioned problems and to provide, in place of conventional reaction processes, a novel process for the production of a polysuccinimide (co)polymer derivative and a polysuccinimide (co)polymer derivative produced by this process.

Another object of the present invention is to provide a process for producing a polysuccinimide (co)polymer derivative that does not necessitate a pH-adjusting step (does not use a special pH-adjusting agent) and permits the reaction of a polysuccinimide (co)polymer with a Lewis base at a temperatures within a wide range.

A further object of the present invention is to provide a process for efficiently and easily producing a polysuccinimide (co)polymer derivative that does not use an organic solvent having similar polarity and a high boiling point such as dimethylformamide or N-methylpyrrolidone and allows simple isolation and purification and a polysuccinimide (co)polymer derivative produced by this process.

DISCLOSURE OF INVENTION

It has been well known that the glass transition point (Tg) of polysuccinimide (co)polymer is higher than its decomposition point and when the polysuccinimide (co)polymer is heated for melting, it decomposes before melting. The reaction temperature, therefore, has been required to be set in a relatively narrow temperature range, for example, from 0° to 100° C.

The present inventors have made a diligent study to achieve the objects as described above, to find that a polysuccinimide (co)polymer which is insoluble at a normal temperature under a normal pressure, when heated in the presence of a solvent having a low boiling point and high relative permittivity, presents fluidized (partly molten) state (a substance in this state is hereafter referred to as "fluidized product" in this specification) without substantially being decomposed at a higher and wider temperature as in the range of 90° to 300° C. than that previously known. They also found that by reacting the polysuccinimide (co)polymer in such a fluidized state with a Lewis base, a polysuccinimide (co)polymer derivative can be easily produced without using an organic solvent having a high boiling point and a polarity similar to that of polysuccinimide derivative such as dimethylformamide and N-methylpyrrolidone.

The present inventors have also found that the use of the method as described above can eliminate need for the pH-adjusting agent that has indispensably been used in the prior arts, which leads to a significant improvement in the reaction efficiency, because of the absence of a competing base.

The present invention has been completed based on these knowledge.

To be specific, the above objects can be achieved by a process for the production of a polysuccinimide (co)polymer derivative which comprises reacting by heating a polysuccinimide (co) polymer with a Lewis base in the presence of a solvent having a low boiling point and high relative permittivity; and a polysuccinimide (co)polymer derivative produced by this process.

BEST MODE FOR CARRYING OUT THE INVENTION

The present invention will be explained in detail as follows.

According to the first aspect of the present invention, a process for the production of a polysuccinimide (co)polymer derivative which comprises reacting a polysuccinimide (co) polymer with a Lewis base in the presence of a solvent having a low boiling point and high relative permittivity is to be provided.

In the process of this invention, the polysuccinimide (co)polymer used as a raw material should not be particularly limited so long as it have as a repeating unit at least a succinimide ring represented by the following formula:

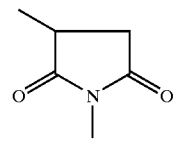

It may include every polysuccinimide (co)polymers which have been usually called as such. Typically, it includes polysuccinimide, polysuccinimide (co)polymers having a repeating unit other than a succinimide ring and succinimide derivatives having the succinimide rings of these polymers or copolymers optionally opened or modified. Among other polysuccinimide (co)polymers, polysuccinimide and polysuccinimide-glutamic anhydride copolymer, particularly polysuccinimide may be preferably used. In this case, no limitations should be imposed on the kinds of the repeating unit in the polysuccinimide (co)polymer having the repeating unit other than succinimide ring, as long as it have two or more functional groups or the salts thereof capable of being reacted with an amino group and/or a carboxyl group. The repeating unit may include amino acid, hydroxycarboxylic acid, hydroxycarboxylic amide, ammonium salts of hydroxycarboxylic acid, aminocarboxylic acid, aminocarboxylic amide, ammonium salts of aminocarboxylic acid, dicarboxylic acid, ammonium salts of dicarboxylic acid and dicarboxylic amide. These repeating units included in the polysuccinimide (co)polymer may be a single component or in the mixed form of two or more components. While there are no specific restrictions on the content of the repeating unit other than the succinimide ring in using the polysuccinimide (co)polymer, the content may be generally not more than 50%, preferably not more than 45% or more preferably not more than 40%. Among other polysuccinimide (co)polymers cited above, polysuccinimide may be preferably used in this invention.

The present invention does not impose specific restrictions on the molecular weight of the polysuccinimide (co) polymer used as a raw material. A polysuccinimide (co) polymer of any molecular weight may be used. Typically, the molecular weight of polysuccinimide (co)polymer may be in the range of 300 to 1,000,000, preferably 500 to 500,000, or more preferably 1,000 to 100,000. Since polysuccinimide (co)polymers having a molecular weight in the approximate range of 6,000 to 7,000 are producible or generally available, these polysuccinimide (co)polymers may be used as it is in this invention. The molecular weight cited in this specification is a number to be determined according to the same method as described in the examples given below.

The method for the preparation of the polysuccinimide (co)polymer should not be particularly restricted. It may be prepared by well-known methods using aspartic acid, (poly) aspartate ammonium, ammonium maleate or maleic amide as a starting material, for example, by heating L-aspartic acid in the presence of or in the absence of phosphoric acid (See U.S. Pat. No. 3,927,204 and P. Neri et. al., J. Med. Chem., 16, 893 (1973)).

In this invention, a chain extender and/or an acid catalyst may be included in the manufacturing process of the polysuccinimide (co)polymer as the raw material. The term "chain extender" as used herein means an organic compound having a functional group capable of being reacted with an amino group and/or a carboxyl group and also capable of being reacted with the polysuccinimide (co)polymer as the raw material to form the repeating unit.

The chain extender which can be used in this invention should not be particularly restricted so long as that it have two or more functional groups or the salts thereof capable of being reacted with an amino group and/or a carboxyl group. Chain extenders which have been used for increasing a molecular weight may be similarly used. As the typical examples thereof, dicyclohexylcarbodiimide, amino acid, hydroxycaboxylic acid, hydroxycarboxylic amide, ammonium salts of hydroxycarboxylic acid, aminocarboxylic acid, aminocarboxylic amide, ammonium salts of aminocarboxylic acid, dicarboxylic acid, ammonium salts of dicarboxylic acid, dicarboxylic amide, aspartic monoammonium, aspartic diammonium, aspartic monoamide, aspartic diamide, maleic monoammonium, maleic diammonium, maleic monoamide, maleic diamide, fumaric monoammonium, fumaric diammonium, fumaric monoamide, fumaric diamide, polysuccinimide and polyaspartic acid. Among other chain extenders, polysuccinimide and polyaspartic acid may be preferably used.

The acid catalyst to be used in this invention should not be specifically limited, and conventional acid catalysts can-beused. Typically, sulfuricacid, phosphoricacid, boric acid, p-toluenesulfonic acid, phosphorous acid, phosphites and the like may be cited. Prefreably, phosphoric acid and boric acid may be preferable.

Further, in this invention, when the chain extender is incorporated in the production process of the polysuccinimide (co)polymer as the raw material, the amount of the chain extender to be used may be suitably decided, depending on an intended degree of increased molecular weight. Generally, the ratio by weight thereof based on the polysuccinimide (co)polymer as the raw material is in the range of 1:0.001 to 1:1, preferably 1:0.005 to 1:0.5. In the case of incorporating the acid catalyst in the production process of the polysuccinimide (co)polymer as the raw material, the amount of the acid catalyst to be used may be suitably decided, depending on an intended degree of increased molecular weight. Generally, the ratio by weight thereof based on the polysuccinimide (co)polymer as the raw material is in the range of 1:0.001 to 1:1, preferably 1:0.005 to 1:0.5. Further when the chain extender and the acid catalyst are added in combination to the polysuccinimide (co)polymer as the raw material, the ratio of addition may be likewise suitably decided, depending on an intended degree of increased molecular weight. There is no limitation for the ratio as long as it stay within the ranges given above. Generally, the ratio by weight of the chain extender to the acid catalyst is in the range of 1:0.001 to 1:1000, preferably 1:0.01 to 1:100.

The timing for adding the chain extender and/or the acid catalyst to the polysuccinimide (co)polymer as the raw material may not be particularly limited. The chain extender and/or acid catalyst can be added together with the polysuccinimide (co)polymer as the raw material, or alternatively can be either collectively or sequentially added in the polysuccinimide (co)polymer as the raw material.

According to the method of this invention, the raw material polysuccinimide (co)polymer, by being heated in the presence of a solvent having a low boiling point and high relative permittivity, may become fluidized to form a fluidized product. The terms "fluidize" and "fluidized product" used herein are referred to as an operation(s) to cause the polysuccinimide (co)polymer as the raw material to be partly dissolved or partly molten itself in the solvent having a low boiling point and high relative permittivity, to form a homogeneous viscous body as a whole (starch syrup-like state) and a material exhibiting such a state, respectively.

So long as it satisfies the above definitions, the solvent having a low boiling point and high relative permittivity employed in this invention has no other limitations and free to use. A solvent which may be preferably used in this invention may have a boiling point in the range of 50° to 150° C., more preferably in the range of 60° to 145° C., and most preferably in the range of 70° to 120° C. The relative permittivity at 20° C. thereof may be preferably not less than 20, more preferably not less than 25 and most preferably not less than 30. If the boiling point of the solvent is less than 50° C., the polysuccinimide (co)polymer as the raw material would not be fully fluidized in the solvent, which is undesirable. On the other hand, if the boiling point exceeds 150° C., the removal of the solvent left after the reaction would become difficult, which is also undesirable. Further, if the relative permittivity of the solvent at 20° C. is below 20, the affinity of the solvent with the polysuccinimide (co)polymer derivative aimed at would be degraded and the homogeneity in the reaction would be remarkably lowered, which is undesirable.

Examples of the solvent having a low boiling point and high relative permittivity which can be used in this invention may be water, 2,6-difluoropyridine, formic acid, nitro methane, acetonitrile, acrylonitrile, 2-fluoropyridine, methanol, ethanol, isopropyl alcohol and acetone. Among other solvents, water, formic acid, acetonitrile, methanol and ethanol, more advantageously water and formic acid may be advantageously used as the solvent. Further, water may be particularly advantageously used in view of the fact that it is not inflammable nor toxic, highly safe (in terms of handling, environmental protection and residual solvent) and does not require special facilities for drying. The solvents cited above may be used singly or in the mixed or dispersed form of two or more solvents.

Alternatively, in this invention, the solvent having a low boiling point and high relative permittivity may be such a solvent as to be obtained by mixing or dispersing another solvent having a boiling point and/or relative permittivity deviating from the preferred range defined in this invention in the solvent(s) exemplified above so as to have the mixed or dispersed solvents manifest a given boiling point and/or relative permittivity as exemplified above. For example, in the case of a solvent having a boiling point in the range of 50° to 150° C. but relative permittivity of less than 20, it can be mixed with or dispersed into the above-mentioned solvent with a low boiling point (in the range of 50° to 150° C.) and a high relative permittivity (not less than 20) so that the obtained solvent has relative permittivity of not less than 20. As the examples of the another solvent having a boiling point and/or relative permittivity deviating from the preferred range defined in this invention, hexane, toluene and ethyl acetate may be cited.

The amount of the used solvent having a low boiling point and high relative permittivity should not be particularly limited, so long as it fluidize the polysuccinimide (co)polymer as the raw material. To be specific, the amount, in terms of the weight ratio, may be in the range of 0.1 to 100, preferably 0.2 to 50, more preferably 0.3 to 20, per the polysuccinimide (co)polymer. If the amount of the used solvent having a low boiling point and high relative permittivity is less than 0.1, the polysuccinimide (co)polymer as the raw material would not be fully fluidized and a homogeneous system can not be obtained, which is undesirable. In contrast, if the amount of the used solvent having a low boiling point and high relative permittivity exceeds 100, the concentration of the polysuccinimide (co)polymer as the raw material in the solvent is too low for the (co)polymer to achieve a sufficiently high molecular weight. This is uneconomical and also undesirable.

In this invention, the term "Lewis base" used herein corresponds to a base in the feature of acid/base defined by G. N. Lewis and is referred to as an electron donor. A Lewis base as is used in the first aspect of this invention should not be particularly limited and any known base may be used. As the typical examples thereof, straight or branched hydrocarbons of 1 to 18 carbon atoms, preferably 2 to 17 carbon atoms, and more preferably 3 to 16 carbon atoms having at least one group selected from the group consisting of an amino (—$NH_2$—) group, an imino (—NH—) group, a mercapto (—SH) group ,and a hydroxyl (—OH) group; and ammonia may be cited. More specifically, the straight or branched hydrocarbon of 1 to 18 carbon atoms having at least one group selected from the group consisting of an amino (—$NH_2$—) group, an imino (—NH—) group, a mercapto (—SH) group ,and a hydroxyl (—OH) group includes primary amines, secondary amines, diamines, polyamines, alcohols, polyhydric alcohols such as dialcohols, thiol, dithiol, polythiol, aminoalcohol, hydroxythiol and furthermore specifically, primary amines such as methylamine, ethylamine, propylamine, isoprpylamine, butylamine, amylamine, hexylamine, heptylamine, octylamine, nonylamine, decylamine, undecylamine, dodecylamine, tridecylamine, tetradecylamine, pentadecylamine, cetylamine, octadecylamine, aniline, benzylamine, o-, m-, and p-toluidine; secondary amines such as dimethylamine, diethylamine, dipropylamine, diisoprpylamine, dibutylamine, hexamethylenediamine, methylaniline, ethylaniline, dibenzylamine, diphenylamine, and diamylamine; diamines such as 1,12-diamidedecane; alcohols such as methanol, ethanol, propyl alcohol, isopropyl alcohol, butyl alcohol, isobutyl alcohol, sec-butyl alcohol, tert-butyl alcohol, n-amyl alcohol, isoamyl alcohol, hexyl alcohol, heptyl alcohol, octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, benzyl alcohol, cyclopentanol, cyclohexanol, and 1,2,4-benzene triol; polyhydric alcohols such as glycerin, ethylene glycol, propylene glycol, polyethylene glycol, and polyvinyl alcohol; thiols such as methyl mercaptan, ethyl mercaptan, propyl mercaptan, isopropyl mercaptan, n-butyl mercaptan, dodecyl mercaptan, allyl mercaptan, benzyl mercaptan, dimetyl mercaptan, diethyl mercaptan, dipropyl mercaptan, dibutyl mercaptan, diallylmercaptan, and benzyl mercaptan; aliphatic polyamines such as hydrazine, ethylenediamine, propylenediamine, 1,4-butanediamine, pentametylenediamine, hexamethylenediamine, heptamethylenediamine, octamethylenediamine, nonamethylenediamine, decamethylenediamine, undecamethylenediamine, dodecamethylenediamine, tetradecamethylenediamine, hexadecamethylenediamine, 1-amino-2,2-bis(aminomethyl) butane, tetraaminomethane, diethylenetriamine, and triethylenetetraamine; alicyclic polyamines such as norbornene diamine, 1,4-diaminocyclohexane, 1,3,5-triaminocyclohexane, and isophoronediamine; aromatic polyamines such as phenylenediamine, tolylenediamine, and xylenediamine; basic amino acids or the esters thereof; compounds having not less than one molecule of a monoamino compound such as cystamine bonded via not less than one disulfide bond and polyamines such as the derivatives thereof; aliphatic polythiols such as 1,2-ethanedithiol, 1,3-propanedithiol, 1,4-butanedithiol, 1,6-hexanedithiol, and pentaerythrithiol; cyclic polythiols such as cyclohexanedithiol; aromatic polythiols such as xylenedithiol, benzendithiol, and toluenedithiol; esters of such as trimethylolpropane tris (thioglycolate), trimethylolpropane tris(3-mercaptopropionate) pentaerythritol tetrakis(thioglycolate), and pentaerythritol tetrakis(3-mercaptopropionate) polythiol. Alternatively, protein-constitutive amino acids represented by lysine, cystine, and ornithine, and the salts and esters there of may be used as the Lewis base. Among other Lewis bases, primary amines, secondary amines, diamines, alcohols, aminoalcohols, thiols, aminothiols and ammonia, particularly primary amines, diamines, and aminothiols may be preferably used. In this case, the Lewis bases can be used either singly or in the mixed form of two or more members cited above.

In this invention, the amount of the used Lewis base can appropriately be determined depending on the kinds of the polysuccinimide (co)polymer as the raw material, the Lewis base and the desired polysuccinimide (co)polymer derivative to be used. The amount of the Lewis base used may be such that 0.1 to 100 mol %, preferably 0.5 to 90 mol %, more preferably 1 to 80 mol % of the total succinimide rings are modified by the Lewis base (reacted with the Lewis base). The expression "X mol % of the total succinimide rings are modified by the Lewis base (reacted with the Lewis base)" means that X % of the succinimide rings of the polysuccinimide (co)polymer as the raw material are modified by the Lewis base (reacted with the Lewis base). If the amount of the used Lewis base is less than 0.1 mol %, the succinimide rings of the polysuccinimide (co)polymer as the raw material would not be modified satisfactorily and thus the yield of the desired product would be unduly low, which is undesirable. On the contrary, even if the amount of the used Lewis base exceeds 100 mol %, there would exist no succinimide rings of the polysuccinimide (co)polymer as the raw material to be modified by the Lewis base and hence the yield of the desired product would not be proportionally improved, which is economically undesirable, and the presence of the unreacted Lewis base remained in the system would be another disadvantage.

The method of this invention is characterized in that the polysuccinimide (co)polymer is fluidized in the presence of a solvent having a low boiling point and high relative permittivity and reacted with a Lewis base. The method desirably comprises a step of heating the polysuccinimide (co)polymer as the raw material in advance in the presence of the solvent having a low boiling point and high relative permittivity for the sufficient fluidization. The heating temperature has no specific limitations, as long as it is high enough for the polysuccinimide (co)polymer as the raw material to form a fluidized product. The temperature may be generally in the range of 50° to 300° C., preferably 60° to 250 ° C., more preferably 70° to 210° C., and most preferably 100° to 110° C. If the heating temperature is below 50° C., the polysuccinimide (co)polymer as the raw material would not be fully fluidized, and dispersed partially in the powdery form, the reaction hardly would proceed and the homogeneous objective product can not be obtained, which is undesirable. In contrast, if the heating temperature exceeds 300° C., the polysuccinimide (co)polymer as the raw material would be decomposed and the heat efficiency would be unduly low, which are uneconomical and also undesirable. The (heating/fluidization) reaction time may be generally in the range of 0.5 to 72 hours, preferably 1 to 48 hours.

In the method for the production of this invention, the reaction conditions of the polysuccinimide (co)polymer in fluidized state with the Lewis base may be varied depending on the kinds of the used materials [i.e., polysuccinimide (co)polymer and Lewis base] and the solvent having a low boiling point and high relative permittivity. The temperature has no specific limitations and can optionally be chosen, as long as it maintain the fluidization of the polysuccinimide (co)polymer. For example, when an amine is used as the Lewis base, the reaction temperature may be in the range of 50° to 300° C., preferably 55° to 250° C., more preferably 60° to 210° C., and most preferably 100° to 110° C., and the reaction time may be generally in the range of 0.5 to 72 hours, preferably 1 to 48 hours. When a Lewis base other than an amine is used, the reaction temperature may be generally in the range of 90° to 300° C., preferably 95° to 250° C., more preferably 98° to 230° C., and most preferably 100° to 110° C., and the reaction time may be generally in the range of 0.5 to 72 hours, and preferably 1 to 48 hours. Further, the reaction can be carried out under a normal, increased or reduced pressure. From the viewpoint of the stabilization of product qualities, the temperature and pressure during the reaction may be desirably maintained constantly.

In this invention, the timing for adding the Lewis base to the polysuccinimide (co)polymer as the raw material has no specific limitations. The Lewis base can be collectively added together with the polysuccinimide (co)polymer as the raw material which has been fluidized in the presence of a solvent having a low boiling point and high relative permittivity, or alternatively added either collectively or sequentially in the polysuccinimide (co)polymer as the raw material which has been fluidized in the presence of a solvent having a low boiling point and high relative permittivity. Among other timings, the Lewis base may be preferably added sequentially in the polysuccinimide (co)polymer as the raw material which has been fluidized in the presence of a solvent having a low boiling point and high relative permittivity. Further, in the above embodiment, for the purpose of promoting the reaction of the polysuccinimide (co)polymer as the raw material with the Lewis base, an acid catalyst may be used in the reaction system, when necessary. The acid catalyst used herein has no specific limitations. Any known acid catalyst may be used. Typically, sulfuric acid, phosphoric acid, boric acid, p-toluenesulfonic acid, phosphorous acid, phosphite may be cited. Preferably, phosphoric acid, boric acid and p-toluenesulfonic acid may be cited.

In this invention, when an amine as represented by the formula: NH(R)(R') is used as the Lewis acid, the reaction between one repeating unit of the succinimide ring in the polysuccinimide (co)polymer and the Lewis acid is shown by the following reaction formula:

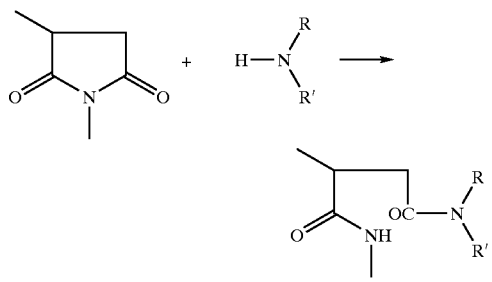

or

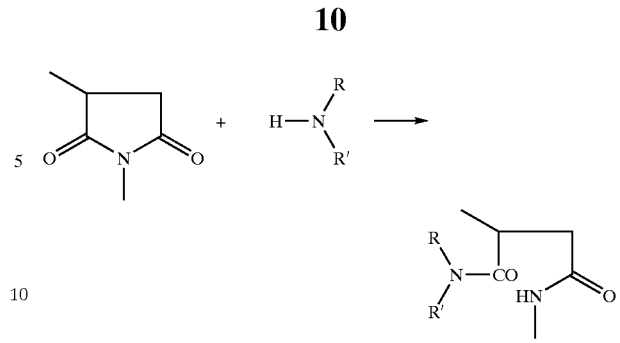

In this invention, the reaction ratio between the succinimide ring and the Lewis acid may be varied depending on the kinds of the polysuccinimide (co)polymer as the raw material, the Lewis base and the solvent having a low boiling point and high relative permittivity. The reaction ratio may be generally in the range of 1 to 100%, preferably 5 to 90%, based on the total number of the succinimide rings in the polysuccinimide (co)polymer as the raw material.

According to the second aspect of the present invention, a polysuccinimide (co)polymer derivative produced by the process described above is to be provided.

The polysuccinimide (co)polymer derivative according to the second aspect of this invention may be obtained, as described above, by reacting a polysuccinimide (co)polymer with a Lewis acid in the presence of a solvent having a low boiling point and high relative permittivity. The molecular weight thereof, although variable depending on the kinds and amounts of the polysuccinimide (co)polymer as the raw material, the Lewis base and the solvent having a low boiling point and high relative permittivity to be used, may be generally in the range of 500 to 1,000,000, preferably 1,000 to 500,000.

The polysuccinimide (copolymer derivative thus produced of this invention can find various applications. It can be used for a water-absorbent resin (material), a detergent, a builder for a detergent, an antiscaling agent, a chelating agent, a dispersant, an additive for a fertilizer, and the like. More specifically, a water-absorbent resin (material) can be produced using the polysuccinimide (co)polymer derivative of this invention by conventional methods as disclosed in EP-A-866084, JP-A-10-292,044 and WO 96/20237, for example.

Since the polysuccinimide (co)polymer derivative of this invention is converted into a biodegradable polyaspartic acid by the hydrolysis with an alkali, such an advantage can be obtained as that it can be subjected to the easy disposal and is particularly available as a material for a biodegradable resin.

Now, this invention will be described more specifically below with reference to working examples.

A molecular weight was determined by gel permeation chromatography (GPC) under the following conditions. A calibration curve was made using polyethylene standards manufactured by TOSO Corp. For a molecular weight of a sample, a peak-top molecular weight was adopted as the molecular weight thereof.

Method for Determination of Molecular Weight

Detector: RI
Carrier: Solution of 10 mM LiBr in N-methyl pyrrolidone
Column: Shodex KF-G
   Shodex KF-805L
   TOSO TSKgel GMHHR-M
Flow rate: 0.7 ml/min
Temperature: 40° C.

PREPARATION OF EXAMPLE 1

245 g of Maleic anhydride and 500 g of water were placed in an eggplant type flask to dissolve therein. To the resultant solution, 170 g of an 25% ammonia aqueous solution was dropped slowly while avoided bumping. After the solution became homogeneous, the mixed solution was heated in a rotary evaporator at an oil bath temperature of 100° C. and concentrated in vacuo until crystals were separated. The maleic momoammonium thus obtained was poured into a stainless steel pad and heated using a hot air dryer at 180° C. for 3 hours. After cooling, polysuccinimide (PSI-1) having a molecular weight of 3,950 was obtained.

10 g of water was added to the resultant PSI-1. The mixture was heated at 130° C., to afford a homogeneous fluidized product of polysuccinimide.

PREPARATION EXAMPLE 2

1 kg of L-aspartic acid was placed in a stainless steel pad and 1 kg of water was additionally placed thereto. The resultant mixture was heated at 205° C. for 18 hours in a hot air dryer and then cooled, to afford polysuccinimide (PSI-2). The molecular weight of the PSI-2 thus obtained was measured to be 8,959.

EXAMPLE 1

10 g of the PSI-1 to be obtained in Preparation Example 1, 10 g of water, and 23.24 g of hexamethylenediamine were placed in a eggplant type flask and heated at 160° C. in an oil bath. The mixture assumed a fluidized state after 5 minutes from the start of heating. Then, the bath temperature was maintained at 105° C. for one hour and 30 minutes, 175° C. for 15 minutes, 180° C. for 15 minutes and 190° C. for one hour and 30 minutes. By this heating, almost all the water in the flask was removed, to afford 33.5 g of a solid. This solid was insoluble in water, dimethyformamide (DMF), N-methylpyrrolidone, and tetrahydrofuran (THF). The molecular weight thereof was appeared to become relatively large because of the cross-linking.

EXAMPLE 2

5 g of the PSI-1 to be obtained in Preparation Example 1 and 5 g of water were placed in an eggplant type flask and heated in an oil bath (a bath temperature of 130° C.) for 5 minutes to be fluidized. To this mixture, 1.35 g of octadecylamine was added, and then the bath temperature was maintained at 130 ° C. for 15 minutes, and at 140 oc for one hour and 45 minutes, to remove water by distillation and to afford 5.1 g of a solid. The molecular weight of this solid was found to be 4,538.

EXAMPLE 3

5 g of the PSI-1 to be obtained in Preparation Example 1 and 5 g of water were placed in an eggplant type flask and heated in an oil bath (a bath temperature of 130° C.). After 5 minutes from the start of heating, the mixture assumed a fluidized state. To this fluidized product, 6.74 g of octadecylamine was added, and then the bath temperature was maintained at 130° C. for 10 minutes, at 150° C. for 10 minutes, at 180° C. for 40 minutes, and at 190 ° C. for 10 minutes, to remove water by distillation and to afford 11.3 g of a solid. The molecular weight of this solid was found to be 4,677.

EXAMPLE 4

5 g of the PSI-1 to be obtained in Preparation Example 1,5 g of water and 0.2 g of 1,12-diaminododecane were placed in an eggplant type flask and heated in an oil bath at a bath temperature of 180° C. After 5 minutes from the start of heating, the mixture assumed a fluidized state. This fluidized product was heated at bath temperature of 180° C. for one hour and 50 minutes, to remove water by distillation and to afford 5.07 g of a solid. The molecular weight of this solid was found to be 4,546.

EXAMPLE 5

10 g of the PSI-1 to be obtained in Preparation Example 1, 10 g of water and 10.12 g of 1-dodecanethiol added thereto were heated at 140° C. for 5 minutes with stirred in a separable flask equipped with a condenser. After the mixture assumed a fluidized state, 0.02 g of p-toluenesulfonic acid was added thereto. After three hours, the temperature of a heating medium was set at 170° C. After three and a half hours, the condenser was removed for the dehydration. After six hours, 16.57 g of a solid was obtained.

EXAMPLE 6

10 g of the PSI-1 to be obtained in Preparation Example 1, 10 g of water and 11.62 g of n-hexanol added thereto were heated at 140° C. for 5 minutes with stirred in a separable flask equipped with a condenser. After the mixture assumed a fluidized state, 0.0476 g of p-toluenesulfonic acid was added thereto. After three hours, the temperature of a heating medium was set at 170° C. After three and a half hours, the condenser was removed for the dehydration. After six hours, 10.79 g of a solid was obtained.

The results of Example 1 to 6 are summarized in Table 1 below.

TABLE 1

| Examples | Molecular Weight of Raw Material Polysuccinimide | Lewis Base | Molecular Weight of Polysuccinimide Derivatives |
|---|---|---|---|
| 1 | 3,950 | Hexamethylenediamine | Not measurable |
| 2 | 3,950 | Octadecylamine | 4,538 |
| 3 | 3,950 | Octadecylamine | 4,677 |
| 4 | 3,950 | 1,12-Diaminododecane | 4,546 |
| 5* | 3,950 | 1-Dodecanethiol | 4,180 |
| 6* | 3,950 | n-Hexanol | 3,858 |

*p-Toluenesulfonic acid was added as an acid catalyst.

EXAMPLE 7

To a Lab Plastomill (available from TOYO SEIKI Co.) of 30 ml in inner volume, a mixture containing 20 g of the PSI-1 to be obtained in Preparation Example 1, 5 g of 85% phosphoric acid, 10 g of water and 5 g of n-butylamine was added. The mixture was reacted at 230° C. for 30 minutes with stirred (rotor revolution: 50 rpm). After the reaction was completed, 25 g of a product was obtained. The product thus obtained was found to have a molecular weight of 4,381.

EXAMPLE 8

To a Lab Plastomill (available from TOYO SEIKI Co.) of 30 ml in inner volume, a mixture containing 20 g of the PSI-1 to be obtained in Preparation Example 1, 5 g of 85% phosphoric acid, 10 g of water and 5 g of 1,4-butanediol was added. The mixture was reacted at 230° C. for 30 minutes with stirred (rotor revolution: 50 rpm). After the reaction was completed, 25 g of a product was obtained. The product thus obtained was found to have a molecular weight of 4,307.

EXAMPLE 9

To a Lab Plastomill (available from TOYO SEIKI Co.) of 30 ml in inner volume, a mixture containing 20 g of the PSI-1 to be obtained in Preparation Example 1, 5 g of 85% phosphoric acid, 10 g of water and 7.2 g of hexamethylenediamine hydrate was added. The mixture was reacted at 230° C. for 30 minutes with stirred (rotor revolution: 50 rpm). After the reaction was completed, 23 g of a product was obtained. The product thus obtained was insoluble in various solvents due to the gelation, and thus the molecular weight thereof could not be determined but was considered to significantly increase.

EXAMPLE 10

To a Lab Plastomill (available from TOYO SEIKI Co.) of 30 ml in inner volume, a mixture containing 15 g of the PSI-2 to be obtained in Preparation Example 2, 20 g of water and 1 g of lysine was added. The mixture was reacted at 150° C. for 30 minutes with stirred (rotor revolution: 50 rpm). After the reaction was completed, 15 g of a product was obtained. The product thus obtained was insoluble in various solvents due to the gelation, and thus the molecular weight thereof could not be determined but was considered to significantly increase.

EXAMPLE 11

To a Lab Plastomill (available from TOYO SEIKI Co.) of 30 ml in inner volume, 15 g of the PSI-2 to be obtained in Preparation Example 2, and 10 g of water were placed and stirred at 150° C. for 3 minutes. When the system became viscous, an aqueous solution of 1 g of lysine in 10 g of water was added thereto. Then, the resultant mixture was reacted at 150° C. for 30 minutes with stirred (rotor revolution: 50 rpm). After the reaction was completed, 15 g of a product was obtained. The product thus obtained was insoluble in various solvents due to the gelation, and thus the molecular weight thereof could not be determined but was considered to significantly increase.

EXAMPLE 12

To a Lab Plastomill (available from TOYO SEIKI Co.) of 30 ml in inner volume, 10 g of the PSI-2 to be obtained in Preparation Example 2, and 6.7 g of water were placed and stirred at 150° C. for 3 minutes. When the system became viscous, an aqueous solution of 2 g of lysine in 6.7 g of water was added thereto. Then, the resultant mixture was reacted at 150° C. for 30 minutes with stirred (rotor revolution: 50 rpm). After the reaction was completed, 15.5 g of a product was obtained. The product thus obtained was insoluble in various solvents due to the gelation, and thus the molecular weight thereof could not be determined but was considered to significantly increase.

The results of Example 7 to 12 are summarized in Table 1 below.

TABLE 2

| Examples | Molecular Weight of Raw Material Polysuccinimide | Lewis Base | Molecular Weight of Polysuccinimide Derivative |
|---|---|---|---|
| 7 | 3,950 | n-Butylamine | 4,381 |
| 8 | 3,950 | 1,4-Butanediol | 4,307 |
| 9 | 3,950 | Hexamethylenediamine hydrate | Not measurable |
| 10 | 8959 | Lysine | Not measurable |
| 11 | 8959 | Lysine | Not measurable |
| 12 | 8959 | Lysine | Not measurable |

INDUSTRIAL APPLICABILITY

As mentioned above, the process for producing a polysuccinimide (co)polymer derivative of this invention is characterized in that a polysuccinimide (co)polymer is allowed to react with a Lewis base by heating in the presence of a solvent having a low boiling point and high relative permittivity. Since the use of a solvent having a low boiling point and high relative permittivity according to the method of this invention enables the polysuccinimide (co)polymer as the raw material in a fluidized state to react with a Lewis base in a homogeneous reaction system, therefore, the reaction efficiency of the polysuccinimide (co)polymer with the Lewis base can be improved. That is, an objective polysuccinimide (co)polymer derivative can be produced in a high yield.

Further, the reaction has been heretofore required to be carried out at a temperature within a narrow range (0° to 100° C.), because of the liability of polysuccinimide to be decomposed. On the other hand, the method of this invention enables the reaction of a polysuccinimide (co)polymer with a Lewis base to be conducted over a wide temperature range (50° to 300 ° C.). The method can also eliminate the use of a pH-adjusting agent which has been heretofore indispensable, and thus no competitive bases are present. Therefore, the reaction efficiency of the polysuccinimide (co)polymer with the Lewis base can be significantly improved. That is, a polysuccinimide (co)polymer derivative can be obtained in a higher yield.

Furthermore, another advantage of the process of this invention is that according to the method of this invention, an objective polysuccinimide (co)polymer derivative can be easily separated from the solvent, because the reaction of a polysuccinimide (co)polymer with a Lewis base is carried out in the presence of a solvent having a low boiling point and high relative permittivity (i.e., having a low affinity with the objective product).

The polysuccinimide (co)polymer derivative produced by the process of this invention can be used for various applications such as a water-absorbent resin (material), a detergent, a builder for a detergent, an antiscaling agent, a chelating agent, a humectant, a dispersant, an additive for a fertilizer.

What is claimed is:

1. A process for producing a polysuccinimide (co)polymer derivative, comprising reacting a polysuccinimide (co)polymer in a fluidized state with a Lewis base by heating in the presence of a solvent having a low boiling point and high relative permittivity.

2. The process according to claim 1, wherein said Lewis base is at least one member selected from the group consisting of a straight or branched hydrocarbons of 1 to 18 carbon atoms having at least one group selected from the group consisting of an amino (—NH$_2$—) group, an imino (—NH—) group, a mercapto (—SH) group and a hydroxyl (—OH) group and ammonia.

3. The process according to claim 1, wherein said solvent has a boiling point in the range of 50° to 150° C. and has a relative permittivity of not less than 20.

4. The process according to claim 3, wherein said solvent is water.

5. The process according to claim 1, wherein the weight ratio of the solvent having a low boiling point and high relative permittivity to the polysuccinimide (co)polymer is in the range of 0.1 to 10.

6. The process according to claim 1, wherein said Lewis base is sequentially to the polysuccinimide (co)polymer which has been fluidized in the presence of a solvent having a low boiling point and high relative permittivity.

7. The process according to claim 1, wherein said reaction by heating is carried out in the presence of an acid catalyst.

8. The process according to claim 7, wherein said acid catalyst is at least one member selected among phosphorous acid, boric acid and [[p-oluenesulfonic]] p-toluenesulfonic acid.

9. A polysuccinimide (co)polymer derivative produced by the process set forth in claim 1.

10. The process according to claim 3, wherein said solvent has a relative permittivity of not less than 25.

11. The process according to claim 1, wherein said solvent comprises at lease one member selected from the group consisting of water, formic acid, methanol and ethanol.

12. The process according to claim 11, wherein said solvent comprises water or formic acid.

13. The process according to claim 1, wherein said Lewis base is at least one member selected from the group consisting of primary amines, secondary amines, diamines, alcohols, aminoalcohols, thiols, aminothiols and ammonia.

14. The process according to claim 1, wherein said Lewis base is at least one member selected from the group consisting of primary amines, diamines, and aminothiols.

15. The process according to claim 1, wherein said polysuccinimide (co)polymer is polysuccinimide.

16. The process according to claim 1, wherein said polysuccinimide (co)polymer is prepared using aspartic acid, (poly)aspartate ammonium, ammonium maleate, or maleic amide as a starting material.

17. The process according to claim 1, wherein the fluidized state is homogeneous and viscous.

* * * * *